Sept. 29, 1953　　　　　J. BUCHEL　　　　　2,653,454
CONTINUOUS ABSORPTION REFRIGERATION SYSTEM
Filed July 26, 1949　　　　　　　　　　6 Sheets-Sheet 1

Fig. 1.

Inventor,
Jules Buchel.
By Louis A. Bixon,
Attorney.

Sept. 29, 1953      J. BUCHEL      2,653,454
CONTINUOUS ABSORPTION REFRIGERATION SYSTEM
Filed July 26, 1949      6 Sheets-Sheet 6

Inventor:
Jules Buchel.
By Louis A. Bisson,
Attorney.

Patented Sept. 29, 1953

2,653,454

UNITED STATES PATENT OFFICE 2,653,454

CONTINUOUS ABSORPTION REFRIGERATION SYSTEM

Jules Buchel, Covington, La., assignor of one-third to Eliska Louque, New Orleans, La., and one-third to James A. Whittington, Evanston, Ill.

Application July 26, 1949, Serial No. 106,818

13 Claims. (Cl. 62—5)

The present invention relates to a refrigerating system of the absorption type and designed to be continuously operative.

An object of the invention is to provide a novel device of the character referred to and in which is provided absorbing means for the absorption by a weakened liquor of the evaporated fluid, after effecting heat exchange, with means for transferring the resultant strong liquor to the generator of the system.

Another object of the invention is to provide a novel transfer means to automatically cause a transfer of the resultant strong liquor from the absorber to the generator of the system.

A further object of the invention is to provide novel means including control means for automatically causing a transfer of liquor to the generator of the system.

Other objects, advantages, capabilities, features, or the like are comprehended by the invention as will later appear, and as are inherently possessed by the invention.

Referring briefly to the drawings.

Figure 1:
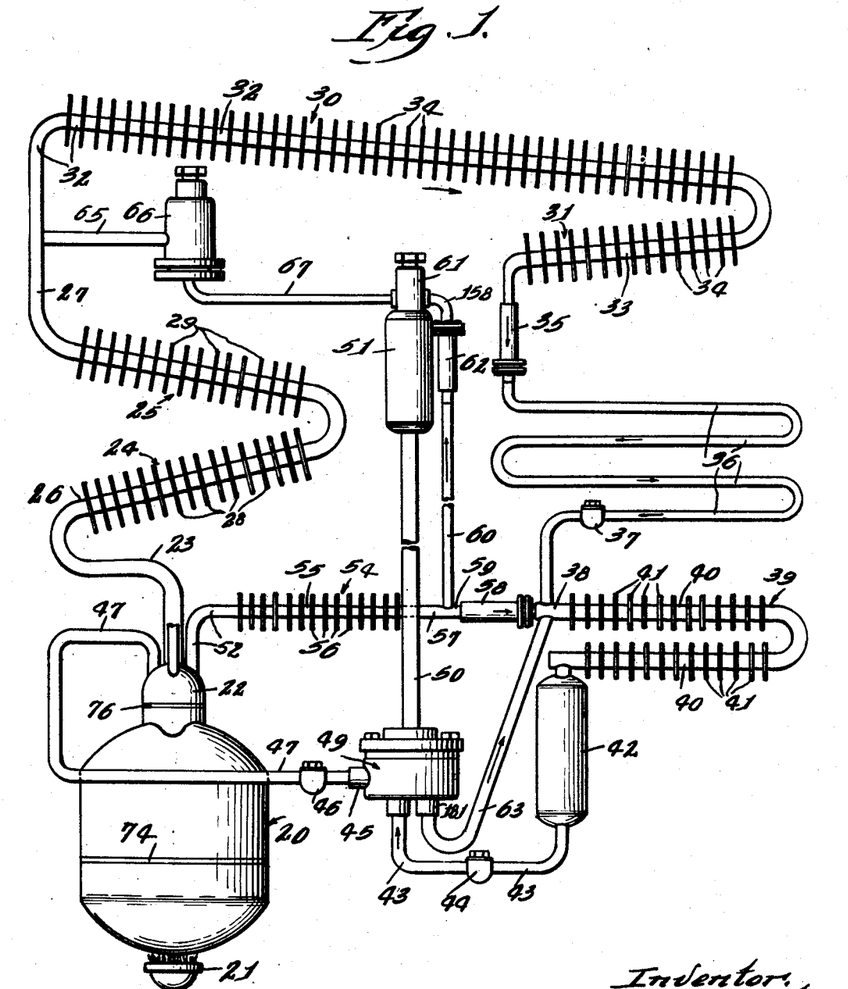
Fig. 1 is a diagrammatic or schematic view of the system embodying the invention.

Referring more in detail to the drawings, the embodiment chosen to illustrate the invention as shown as comprising a generator 20 for containing a fluid, such as a liquid or liquor, which, for example, may be and preferably is a strong ammoniacal liquor, the generator 20 being located over a suitable heating means, such as a gas burner 21, for heating the liquor in the generator and for causing the liberation of ammonia gas. Suitable thermostatic control means (not shown) may be connected to the burner for regulating the action of the burner.

At the top of the generator 20 is provided a drum or dome 22 connected to and in communication with a duct 23 running to a rectifier which may have one or more sections or segments shown generally at 24 and 25. The invention comprehends any number of such sections as desired and found convenient. These sections comprise duct portions 26 and 27 forming continuations of the duct portion 23 connected to the dome 22, and these duct portions 26 and 27 are arranged in inclined position or positions to drain back liquid formed therein to the generator 20 by way of the duct 23 and dome 22.

The duct portions 26 and 27 constitute cores of the segments 24 and 25 and have formed thereon or fixed thereto a series or more of heat radiating fins 28 and 29. The upper end of the rectifier, such as the upper end of the duct portion 27, is connected to and communicates with the upper end of a condenser or condenser unit or assembly having one or more, or any number desired of, sections or segments shown generally at 30 and 31, said sections or segments having body or core ducts 32 and 33 in inclined positions so that any liquid that may form in the ducts 32 and 33 may drain to the lower part of the unit 30—31, the upper and inlet end of the duct 32 being connected to and in communication with the upper and outlet end of the body or core duct 27 of the rectifier section or segment 25. The inclined body or core ducts 32 and 33 carry heat radiating fins 34 and 24, the same as or similar to fins 28 and 29 of the rectifier.

The delivery end of the condenser 30—31 has the lower end of the body duct 33 connected to and in communication with a pressure reducing device or efflux control means 35 which in turn is connected to and communicates with a heat exchange device shown as coils 36, and the latter, at its discharge end, is connected to and communicates with an anti-reflux or check valve 37, the latter being connected to and in communication with the inlet 38 of an absorber 39. At this point is also connected a weak liquor control means 58, the latter being connected to and in communication with the inlet or entry portion 38 of the absorber unit 39. The latter may comprise one or more body duct or coil portions 40, 40, provided with heat conducting fins 41, 41.

The absorber 39 leads to and communicates with a receiver 42 for receiving and collecting the strong ammonia liquor from the absorber 39. This receiver 42 is connected by way of a delivery duct 43 communicating with a transfer control means 49 and having a check valve 44. From the transfer control means 49 runs a duct 45 having a check valve 46 thence to a duct 47 to the upper part of the dome 22 for delivering strong liquor to the generator 20.

The transfer control means 49 is connected to and is in communication with an expansion tube 50 leading to a chamber of a transfer unit 51.

Extending up through the dome 22 is a weak liquor duct 52 which has its intake end 53 in the lower chamber portion of the generator 20, and this duct 52 is connected to and communicates with a weak liquor cooler or cooling means 54 having a tubular body or core duct 55 carrying heat conducting fins 56, the core or core duct 55 being connected by way of duct parts 57 and 59 to a flow control device 58 connected to the inlet portion 38 of the absorber 39, and the duct 57 also being connected to and communicating by way of a duct 60 with a liquor control means 62 connected to the upper part 61 of the transfer unit 51, the flow control device 62 being similar to the device 58 in the duct 59, and also similar to the device 35 in the duct to the heat transfer means 36, 36.

Also connected to and communicating with the transfer control means 49 is a duct 63 for ammonia gas exhaust to the absorber 39.

Connected to and communicating with the duct 27 is an ammonia gas duct 65 which runs to and is in communication with a flip valve device 66, and from this flip valve device runs a duct 67 to the top or dome part 61 of the transfer unit 51.

Referring to the generator 20, (see Fig. 2), it is composed of a lower chamber part 68 having a somewhat depressed bottom 69 having a central low point 70 for aiding substantial draining out of liquor or liquid in the generator 20; an upper chamber part 71 having a shoulder 72 and a neck 73. The parts 68 and 71 are suitably united together at a joint 74, such as a weldseam or the like to seal the parts together. At the top, the neck part 73 forms a lower section of the drum or dome 22, and on this neck part is a dome cap 75 forming an upper part of the drum or dome 22, and these parts 73 and 75 are united and sealed together at a joint 76, such as a weldseam or the like to seal the parts together.

Figure 2:
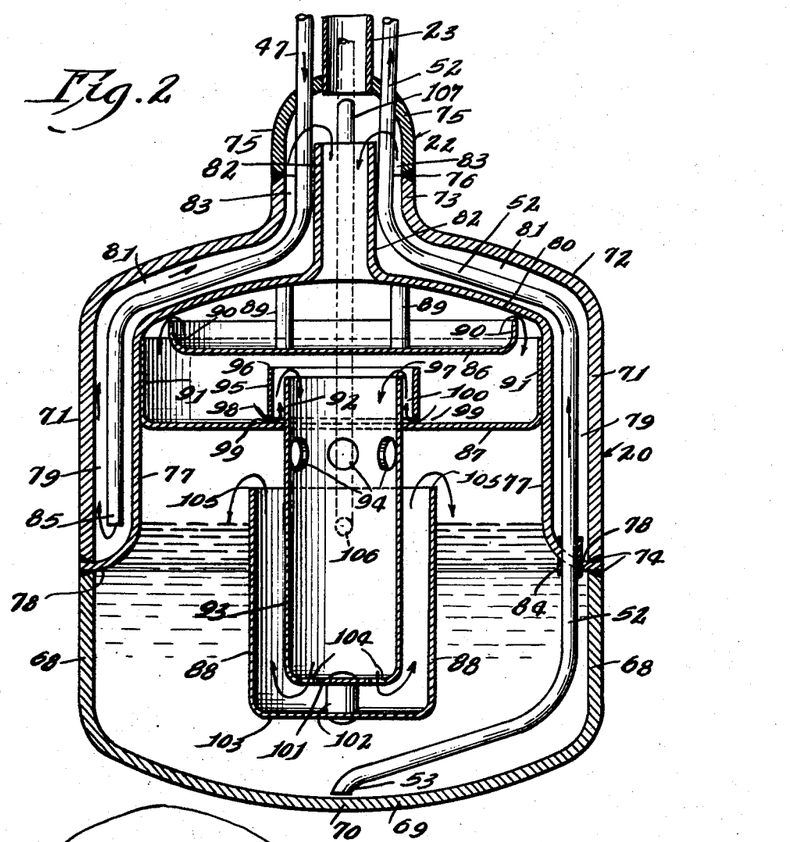
Fig. 2 is a sectional view in a vertical plane of the generating means of the novel system.
Figure 3:
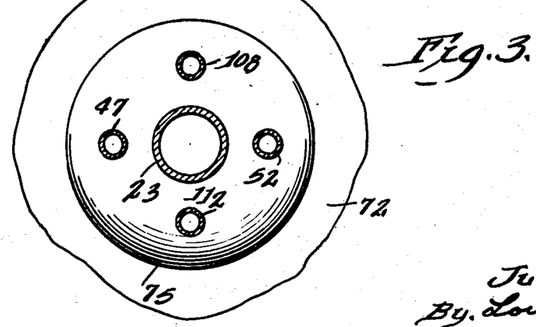
Fig. 3 is a fragmentary top plan view of the same, on an enlarged scale.

In the chamber part 71 is provided a bell-shaped chamber member 77 having a lower skirted rim portion 78 united to and sealed in the joint 74 so as to form an annular chamber 79 between the wall of the chamber part 71 and the wall of the chamber part 77. The chamber member 77 has a shoulder portion 80 spaced from the shoulder portion 72 of the chamber part 71 to form an annular chamber 81, and also has a neck portion 82 extending into the dome 22 and providing an annular chamber 83 between this neck part 82 and the neck and cap portions 73 and 75 of the dome 22.

The duct 52 extends down through the dome cap 75 and into the spaces 83, 81 and 79 and also extends down through the skirt part 78 by way of a suitable sealing joint 84, and extends down into the lower portion of the chamber part 68 of the generator 20, the duct 52 thus having a lower inlet end portion 53 near lowest part of the bottom 69.

At the other side (see Fig. 2) the duct 47, for returning strong liquor to the generator, extends down through the cap 75 into the annular chamber portions 79—81—83 and has an outlet or discharge end portion 85 a short way above the skirt portion 78. The strong liquor thus flowing in by the duct 47 will fill the annular chambers 79—81—83 and then overflow the upper rim of the neck portion 82 and flow down by way of the trays 86, 87, 93 and 94 into the interior of the chamber 77.

Within the generator 20 and within the chambers 77 and 68 is a series of trays or the like 86, 87 and 88 of which the tray 86 has hanger members 89 fixed at their upper ends to the shoulder wall 80 of the chamber member 77, and at their lower ends to the bottom of the tray 86. The tray 86 has an upstanding marginal portion 90 suitably spaced from the shoulder 80 and over which liquor collecting in the pan or tray 86 will flow down more or less in sheet or film form to and into the tray 87. The tray 87 has a high marginal wall or flange 91 suitably sealed to the wall of the chamber 77.

In the center of the tray 87 is provided an opening through which extends upwardly the upper end portion 92 of a receptacle or tray 93 extending down in the receptacle or tray 88 located in the chamber 68 and having its upper portion in the chamber 77. The upper portion 92 of the tray 93 extends up above the bottom of the tray 87 for controlling the level of the liquor in the tray 87 before the liquor will flow down in the member 92—93 in more or less sheet form and also as rain or the like. Spacedly around the portion 92 is an annular wall or baffle 95 having its upper end or edge or rim 96 at a higher level than the upper end or edge 97 of the part 92 of the member 93, and the lower end or edge 98 of the baffle 95 is suitably spaced above the bottom of the tray 87 to provide an annular entry or inlet 99 from the space of the tray 87 to the annular space 100 between the parts 92 and 95.

The member 93 is held suspended from the tray 87 by having the upper portion 92 fixed and sealed in the opening provided in the bottom wall of the tray 87, and the tray or receptacle 93 has a lower wall or floor 101 to which is fixed at its upper end a supporting means 102 which in turn is fixed at its lower end to a bottom wall or floor 103 of the receptacle or tray 88. The member or tray 93 has openings 104 in its bottom wall or floor 101 for the flow of liquor into the tray or receptacle 88 so that the liquor may rise to and flow over or spill over the upper rim 105 of the tray 88, and thus flow down in the chamber 68 and accumulate therein to a level gauged by the inlet end portion 106 of a liquid level pipe or duct 107. See Fig. 4. The tray 93 also has a series of openings 94 in the wall of the tray 93 above the level of the rim 105 and below the bottom of the tray 87 to afford an exit for the ammonia gas rising from the liquid in the chamber 68 and 77 and to pass to the dome 22.

Figure 4:
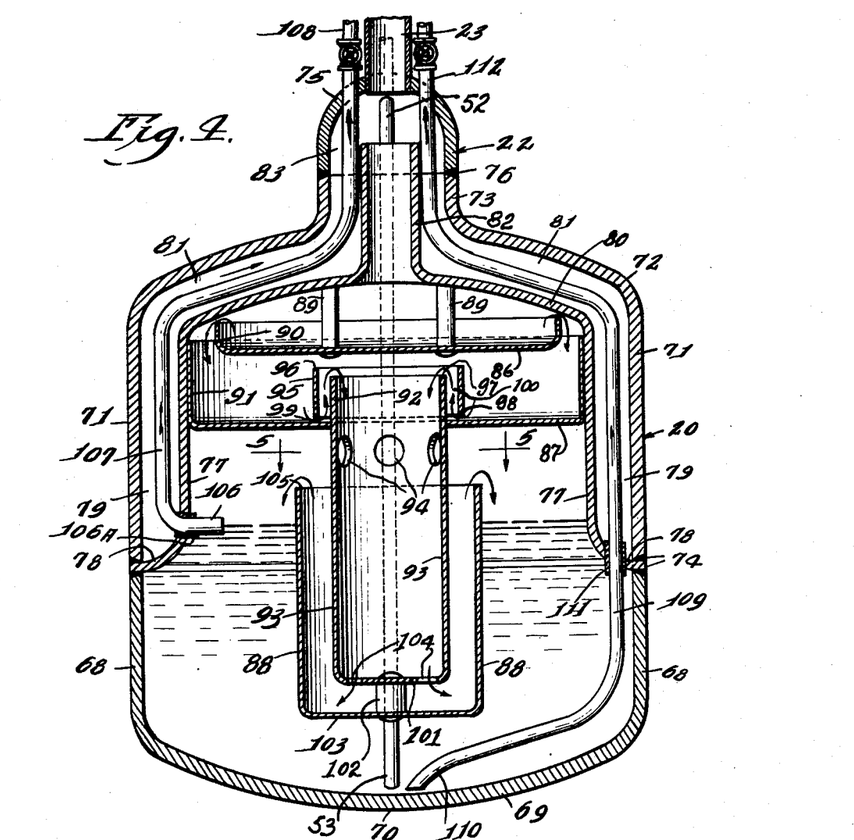
Fig. 4 is a view similar to Fig. 2 and taken in a transverse plane thereto.
Figure 5:
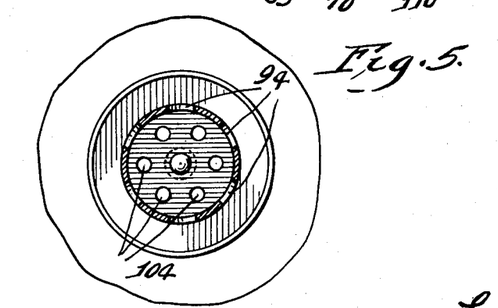
Fig. 5 is a fragmentary horizontal sectional view taken in a plane represented by line 5—5 in Fig. 4 of the drawings.

The liquor level pipe or duct part 106 (see Fig.

4) is at a given height in the chamber 77 and below the top 105 of the tray or receptacle 88, and the pipe or duct 107 extends through the wall of the chamber member 77, with a suitable sealing connection or joint 106A, and extends upwardly through the chambers 79—81—83 and through the dome cap 75 to the exterior, the outer end portion 108 of this duct being provided with any suitable control means, such as a valve (not shown) or the like for controlling the flow of liquor or gas or the like therethrough. See Fig. 4.

There is also provided a liquor drain pipe or duct 109 having an intake portion 110 at the low portion 70 of the lower chamber 68, and the duct 109 extends upwardly through the skirt rim portion 78 of the chamber 77, with a suitable sealing joint or connection 111, and thence upwardly through the chambers 79—81—83 to and through the dome cap 75 to an outside extension 112, which also may have a control means, such as a valve or the like (not shown).

Referring now to the flip valve device 66 (see Fig. 9), it comprises a shell or chamber 113 having a lower open end closed by a cap plate 114 clamped against sealing means or gasket 115 by means of screws 116 passing through the marginal portion of the plate 114 and threaded into a flanged portion 117. The plate 114 has a tubular stub 118 having a valve seat at its upper end for the seating thereon of a valve 119, later described. The plate 114 has a duct socket 120 which is connected to and communicates with the duct 67. At a side of the shell 113 is provided the discharge part of the duct 65. (See Fig. 1.)

At the top the shell 113 has a packing or like gland 122 containing suitable packing or sealing material 123 held in packed and sealing condition by a packing gland or nut 124. Rotatably mounted in the nut 124 is a valve adjusting stem 125 having a nut head 126 at its outer end, and at its inner end is a head 127 rotatable in a socketed portion 128 of the head portion 129 of the shell 113. Threadedly engaged and fixed in the head 127 is the upper end portion of a threaded stem 130 carrying a disc 131 which has at its rim a slot 131A (see Fig. 10) for sliding engagement with a guide pin 132 anchored in the head 129, and extending into the valve chamber 133 of the shell 113.

Figures 9, 10:
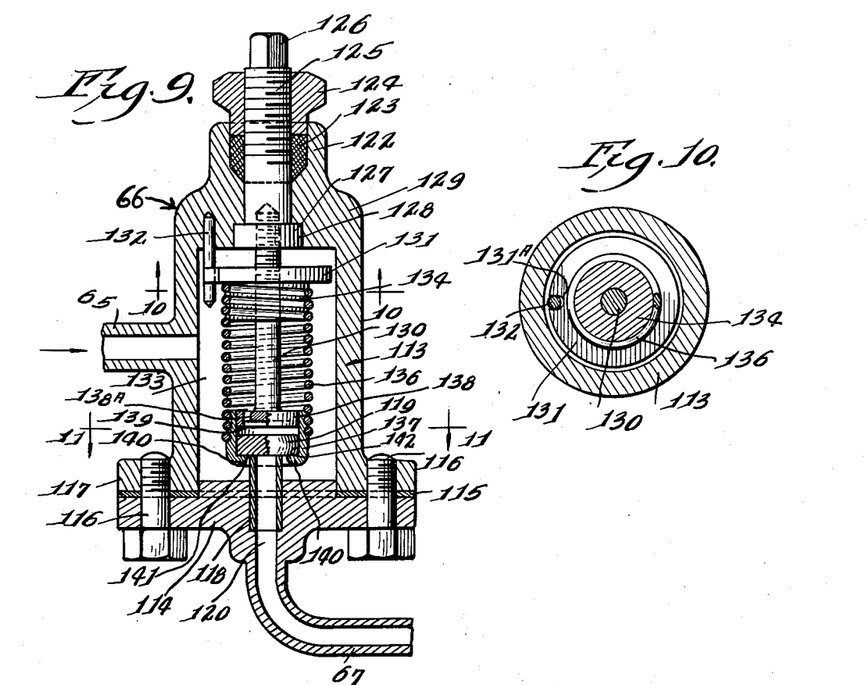
Fig. 9 is a vertical sectional view of the flip valve means 66 shown in Fig. 1.
Fig. 10 is a transverse sectional view taken in a plane represented by line 10—10 in Fig. 9 of the drawings.
Figure 11:
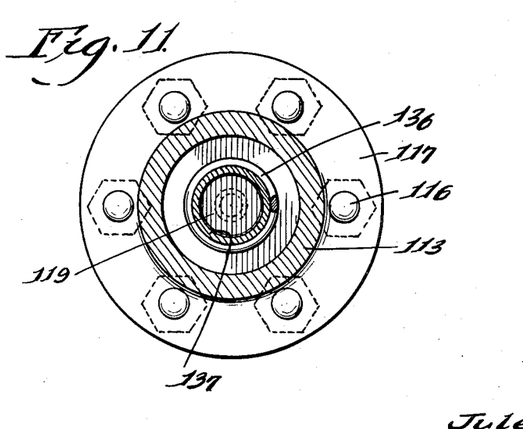
Fig. 11 is a transverse sectional view taken in a plane represented by line 11—11 in Fig. 9 of the drawings.

To the under side of the disc 131 is fixed a head or carrier 134, this head being fixed to the disc 131 and threadedly engaged with the stem 130 so that when the latter is turned the head 134 and the disc 131 will be vertically adjusted when the stem 125—130 is turned by way of the nut head 126. When making such adjustment the packing nut 124 will be loosened, and then tightened after the adjustment is made.

The head or carrier 134 is preferably helically grooved to receive an end portion, as an upper end portion, of a helical or coil spring 136, this spring 136 extending downwardly spacedly around the stem 130 and having its lower end portion connected in a helically grooved part of a valve carrier 137 so that the latter is held suspended from the lower end portion of the spring 136. The valve carrier 137 is in the nature of a cup or the like and has a lower inner lip or flange 140 for the resting thereon of the valve 119 at the marginal portion of the valve 119. The lip or flange 140 is so spaced from the upper end of the duct part 118 as to provide a port or opening 141 which is of a size to permit the upward flow of the ammonia gas from the chamber 133 to the duct part 118 when the valve 119 is off its seat.

The threaded stem 130 has at its lower end a head 138 loosely fitting in the upper portion of the carrier 137 to aid in maintaining the carrier centered and in proper relation to the duct part or stub 118, at the time of operation of the device and when making adjustments of the height or relation of the carrier 137 relative to the duct part 118. The adjustment mentioned is usually such that the valve member 119 will seat on the stub part 118 when the pressure in the chamber 133 appreciably exceeds the pressure in the duct 67. But when the pressure in the chamber 133 and duct 67 are practically equal the valve 119 is lifted from its seat on the stub part 118, by means of the spring 136 and carrier 137. Above the valve member 119 and under the head 138 is a space 139, which determines the distance the valve member 119 may rise from duct part 118. The gas in the chamber 133 freely communicates with the space 139 by reason of the looseness of the head 138 in the carrier 137, but this may be insured by providing suitable apertures or passages 138A in the head 138.

The valve member 119 preferably has a curved rim 142 to prevent the valve member 119 from sticking or jamming in the carrier 137, whereby the action of the valve member 119 will be sensitive and quick.

Figures 6, 7, 8:
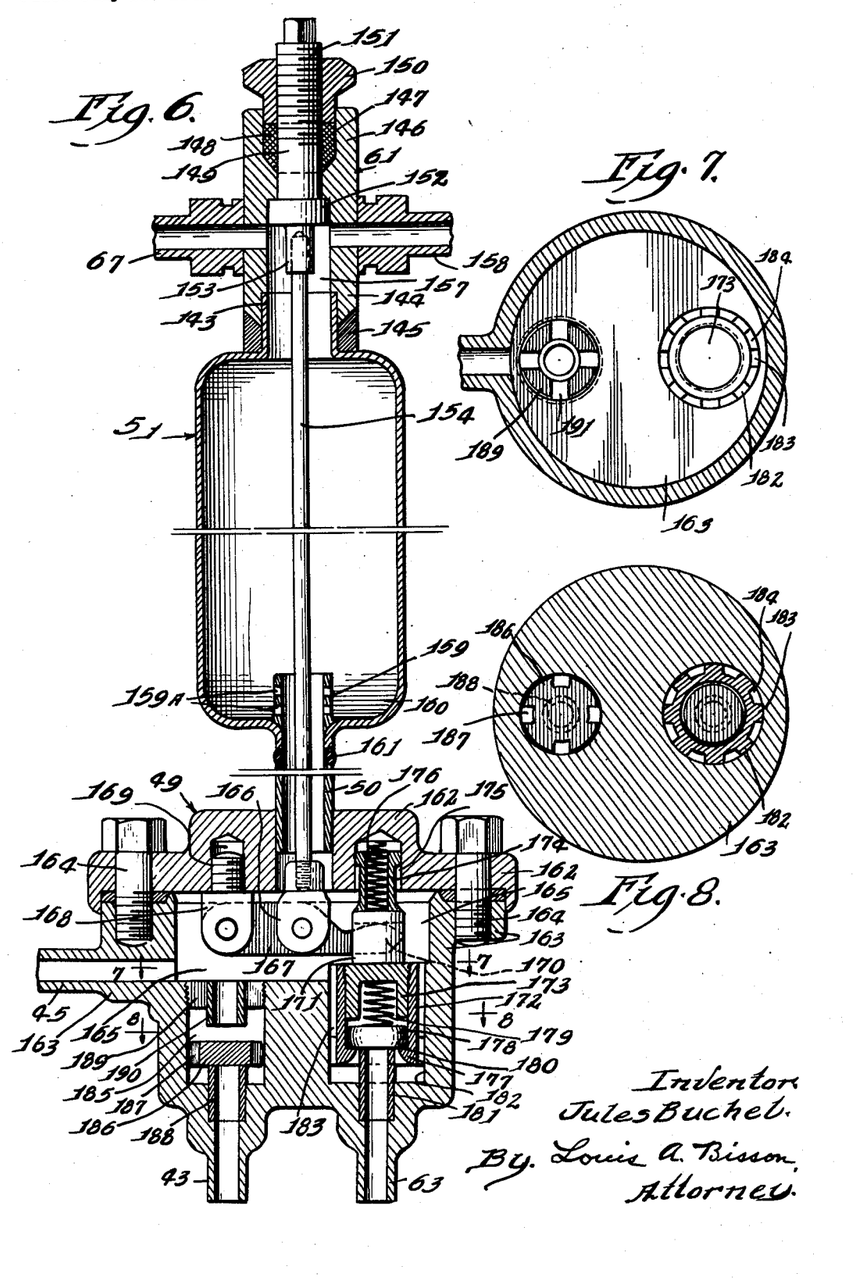
Fig. 6 is a vertical sectional view through the transfer control means 49—50—51 shown in Fig. 1.
Fig. 7 is a transverse sectional view taken in a plane represented by line 7—7 in Fig. 6 of the drawings.
Fig. 8 is a similar view taken in a plane represented by lines 8—8 in Fig. 6 of the drawings.

Referring to the transfer means 49—50—51, as shown in Fig. 6, the chamber member 51 is elongated, as shown (see Fig. 1), in upright disposition, and has an upper open end portion 143 connected to the body part 144 of the head 61. The part 143 is sealed to the part 144 by suitable sealing means 145. The upper end portion 146 of the means 61 has a packing box 147 in which is provided suitable packing 148 for sealing or packing a stem 149 which is threaded to receive a packing nut 150 also threaded to the threaded portion 151 of the stem 149. At the lower end of the stem 149 is fixed a head or collar 152 having a threaded socket or stem portion 153 in which is threaded the upper end portion of a rod or stem 154, preferably composed of Invar or the like so that the length of this stem or rod 154 remains at constant length under different temperatures to which it may be subjected when fluids or the like of different temperatures pass in or through the chamber 51 and the expansion tube 50.

The member 61, at a side, has a duct means 158 for the conveying of weak liquor, to the chamber 157, passing up by way of the pipe or duct 60 and passing through the efflux control means 62, the latter to be described in connection with like devices 58 and 35, this control means 62 in turn being connected to and in communication with the duct or pipe 60 through which weak liquor flows to the means 61 from the weak liquor duct 57. At the other side of the member 61 is connected a fitting for establishing communication to the chamber 157 from the ammonia gas duct or pipe 67 from the flip valve 66.

In the lower part of the chamber 51 is provided an upstanding short tube part or dam 159 having a series of orifices 159A for retarding some liquid in the well 160 around the dam 159. The lower end portion of the chamber 51 is connected by way of a suitable sealing means 161 to the upper end of the expansion tube 50. The expansion tube 50 is preferably relatively long so that the hot fluid passing down in the tube 50 will heat it and cause it to expand so that the transfer control means 49 connected to the tube 50 will be lowered, and the valve means connected to the lower end of the non-expanding Invar rod will be caused to operate and permit the ammonia gas to exhaust by way of the duct 63 to the absorber 39.

The transfer control means 49 comprises a cover or top member 162 suitably sealingly connected to the lower end of the expansion tube 50, and is also sealingly secured to a lower member or bottom 163, as by way of suitable connecting members or elements, such as screws 164 or the like, whereby a valve chamber 165 is provided between the members 162 and 163, as shown in Fig. 6.

The lower end of the rod 154 is suitably connected or fixed to a strap member or element 166 pivotally connected to a lever arm or the like 167 pivotally connected at an end thereof to a pivot post or saddle 168 fixed, as by a threaded stem 169, in the top member 162 of the transfer control means 49. The other or free end portion of the lever arm 167 has a toe or like part 170 extending into a slotted portion 171 of an exhaust valve guide means 172, the latter being connected, as by screw threads, to a foot part 173 of the slotted member 171. The upper end portion 174 of the member 171 is in the nature of a guide stem which is slidable in a guide socket 175 as against a spring 176 normally tending to close the valve 178. The lower end part of the valve guide member 172 has an annular lip 177 upon which may be carried a valve member or disc 178. A spring 179 located in the foot portion 173 of the valve control member 171 acts on the valve disc 178. The valve disc 178 preferably has a rounded or curved edge or rim portion 180 to prevent the valve disc 178 from sticking or jamming in the valve guide member 172 whereby the action of the valve member 178 will be sensitive and quick.

The valve disc member 178 is capable of seating, under the stress of the spring 179, upon the upper end of a tubular part 181 set in the upper end of the duct 63. The valve guide means 172 is located in a well 182 (see Fig. 8) and has vertical ribs 183 so as to provide among them vertical channels 184 communicating with the chamber 165 in the control means 49 and the well 182 beneath the valve disc 178, so that when the lever toe 170 lifts the valve guide means 171—172 and hence the valve disc 178 fluid or gas may exhaust by way of the duct part 181 and duct 63 to the absorber 39.

In the bottom member 163 of the control means 49 is also provided a suction chamber 185 in which is freely movable a suction valve disc 186 having peripheral notches or channels 187, which disc 186 may seat on and close the upper ported end of a tubular part 188 at the upper end of the duct 43. Spacedly above the valve disc 186 and in the upper part of the well 185 is secured in place, as by threads, a valve check device 189 which has a hole in which is a tube 190 for affording communication between the chamber 165 and the well 185, the tube 190 projecting down from the member 189 to act as a stop for the valve disc 186 in its upward movements. The member 189 also has radial notches 191 (see Fig. 7) to maintain said communication between the chamber 165 and the well 185 when the valve disc 186 contacts the lower end of the stop tube 190.

After the ammonia gas has been exhausted by way of the duct 63 to the absorber 39 at which time the valve disc 186 is in closed condition then entry of weak liquor by way of the control means 62 and duct 153 will cause an absorption of ammonia gas and hence a suction in the chamber 51 and tube 50 and chambers 165 and 185, whereby liquor from the receiver 42 is drawn in the chamber 165 by way of the duct 43—43 and up into the tube 50 and chamber 51. This cools the tube 50 and makes it contract, hence, causing a closing of the valve 178, in the duct 63 to the absorber 39. Then when the liquid in the chambers 51 and 50 is forced down, the valve 186 closes and the liquid passes out by way of the duct 45—47 to the dome 22 of the generator and into the generator 20.

Figure 14:
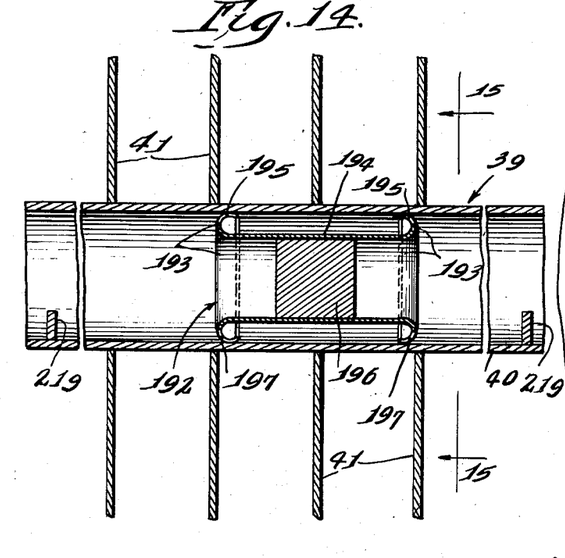
Fig. 14 is a fragmentary longitudinal sectional view of a part of the absorber 39 shown in Fig. 1; and, Fig. 15 is a fragmentary transverse sectional view taken in a plane represented by line 15—15 in Fig. 14 of the drawings.
Figure 15:
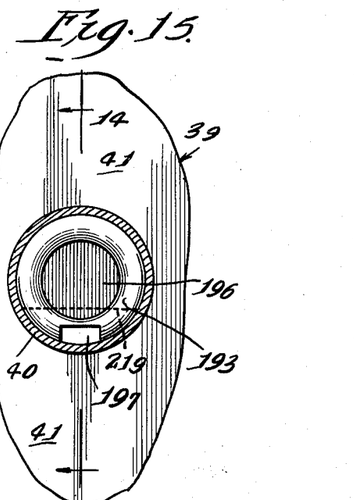

Referring now to the absorber 39, see Figs. 14 and 15, which may have any number of ducts or so called coil legs 40, 40, it is preferable to provide in each duct 40, a series of absorber stops 192 in spaced relation in the ducts 40, 40. Each of these stops comprises a tubular part 194 having curved or curled end portions 193, 193 forming a sort of ring or toric like members coaxial with the axis of the duct 40, and the peripheries of which fit closely within the inner wall of the duct 40. Each part 193 has an annular spring like lip part 195 so that the peripheral portions of the rings 193 will be constantly pressing against the inner surface of the duct 40. Within the tubular part 194 may be provided a plug 196. In the lower part of the rings 193, 193 are provided notches 197, 197 so that liquid moving in the absorber 39 and flowing or passing along the inner lower wall part of the duct or ducts 40, 40 will freely pass to the outlet part or portion of the lower duct 40 of the absorber 39 and to the strong ammonia liquor receiver or chamber 42. The ammonia gases cannot freely pass through the chamber but must bubble through the liquid and notches 197, thereby becoming more completely absorbed by the liquid.

This latter is made possible by providing dams or the like 219 at suitable points along the duct 40 and between the stops 192 to maintain a level of liquid in the duct 40 above the tops of the openings 197 in the stops 192 so that the ammonia gas or gases will be eventually all absorbed in the ammonia by the time the liquor in the absorber is ready to pass to the receiver 42.

Figure 12:
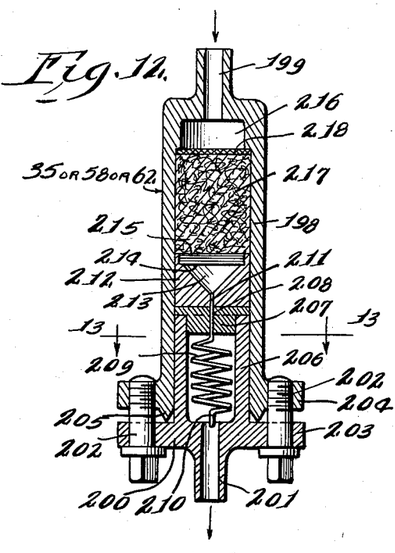
Fig. 12 is a longitudinal sectional view of any of the flow control devices, 35 or 58 or 62 shown in Fig. 1.
Figure 13:
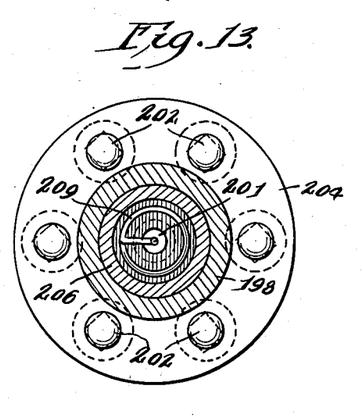
Fig. 13 is a transverse sectional view, on an enlarged scale, taken in a plane represented by line 13—13 in Fig. 12 of the drawings.

Referring to Fig. 1 there are connected respectively in the ducts 33, 59 and 60 efflux controls 35, 58 and 62, which are all alike in construction, and which is shown more in detail and by way of example in Figs. 12 and 13. Each of these devices comprises a chamber member or housing 198 having an inlet tube or neck 199 at an end thereof and a cap 200 at the other end thereof having an outlet tube or neck 201, and secured to such other end of member 198 by means of suitable connecting elements, such as screws or the like 202, passing through a flanged part 203 of the cap 200 and threaded to a flanged part 204. The said other end of the member 198 has a sort of knife edge sealing ring or like part 205 having sealing engagement with the flanged part 203 of the cap 200. The cap 200 has an internally extending chamber portion or tube housing 206 fitting in the outer end portion of the chamber member 198. The inner open end part of the housing 206 is closed by a force fitted plug 207, and this plug has a small bore or orifice through which extends a part of a small tube 208 of capillary type or the like, this tube having a coiled or helical portion 209 located in the chamber 206 and having its outlet end portion 210 near to and in line with the outlet passage of the outlet tube or neck 201.

The other end of the tube 208 is connected to an orifice 211 provided in a steatite plug or the like 212 fitting in the chamber 198 and seated against the plug 207, and this plug 212 has a conical chamber 213 which communicates with the orifice 211 at its apical part and which has a wide mouth opening 214 in which is fitted a porous plug 215 of stainless steel wire gauze or the like. Behind this plug 215 extends another porous plug or the like 217, which may be of cotton or the like, and which is elongated to extend to an entry chamber 216 in communication with the entry tube or neck 199. At the outer end of the plug or member 217 may be a porous member, as a disc of stainless steel wire gauze 218.

Referring again to Fig. 1 in connection with Fig. 12 it will be seen that the inlet neck part 199 (of the control means 62) would be connected to the duct 60, and the outlet neck part 201 would be connected to the duct 158 for conveying weak liquor into the chamber 157 of the dome part 61 and toward the duct 67 for absorbing ammonia gas in transfer chamber 51; and that the inlet part 199 (of the control means 58) would be connected to the duct 59, and the outlet neck part 201 would be connected to tube part 38 for conveying weak liquor into the duct 40 of the absorber 39; and that the inlet part 199 (of the control means 35) would be connected to the duct 33 of the condensers 30, 31 and the outlet neck part 201 would be connected to the inlet duct part of the evaporator 36.

In operation, the presently disclosed embodiment of the invention is designed and intended to operate continuously and automatically, and is preferably air-cooled, and also of the absorptive type. It does not have any inert gas, and it is not necessary to maintain a uniform pressure in the various parts, but functions by virtue of a pressure differential. For the purpose of illustration it may be compared to or said to be comparable to an electrically operated compression system whereby in the herein disclosed system the generator and condenser pressure corresponds to the high or compression side of the electrical machine; and the pressure in the evaporator and absorber corresponds to the low or suction side of the electric unit. It is necessary in both the present and the electric systems to transfer fluids from the low to the high sides of the unit, and this is effected by means of a compressor in the electrical system, and by means of a transfer unit assembly in the present invention.

The refrigerant preferably is ammonia and the absorbent is water. The generator 20 is charged with about a 30 to 32% solution of ammonia and water, when heat is applied to the generator 20, as by way of the heating means 21, ammonia gas is liberated from the charge of liquor in the chamber of the generator 20, and the thus liberated ammonia gas passes upwardly by way of the openings 94 of the chamber 93 to and under the shouldered portion 80 of the bell shaped chamber 77 and through the neck portion 82 to and through the cap portion 75 of the dome 22 and thence by way of the duct 23 to the rectifier unit 24—25 of the device. The pressure of the ammonia gas in the generator 20 will depend a great deal on the temperature of the air surrounding the condenser 30—31, and by way of example, in usual operation, the pressure in the generator may vary from about 150# to about 240#.

The rectifier has inclined duct portions 26—27 for the draining back of any liquid part, such as water, that was carried up in the nature of water vapor or the like by the rising gas, such as ammonia, to be condensed and drained back and to collect, as a solution strong in ammonia, in a tray 86 under the shouldered portion 80 of the bell shaped chamber 77, the forming of the liquid to be thus drained back being effected by cooling or heat exchange through the walls of the ducts 26 and 27 and the cooling fins or the like 28 and 29 carried by such ducts.

The dry or substantially dry ammonia gas then passes from the rectifier to the condenser 30—31 where the gas is liquified at the existing temperature and pressure in the sections 30—31, such as above indicated by way of example. The passage of the gas from the rectifier 24—25 is to the upper end of the duct 32 of the section 30.

The liquid or liquified ammonia then passes through a control device 35 having a capillary tube or the like (see Figs. 12 and 13) to controllably allow flow of the liquid ammonia to the segments or coils 36, 36 of a heat exchange means, wherein the ammonia evaporates to absorb heat from the outside of the coils 36, 36, and hence, cool the medium, such as air, around such coils 36, 36, the liquid ammonia changing from liquid to gaseous state due to the lower pressure in the evaporator coils or the like 36, 36, whereby is effected an absorbing of heat and the producing of refrigeration. The pressure in the coils 36, 36 may be in the range of about 10# to 20#.

The gaseous ammonia then passes out of the evaporator 36, 36 by way of a check valve 37 to an absorber 39. At this point there is admitted a weak ammoniacal liquor which unites with the ammonia vapor passing from the evaporator or refrigerator 36—36 to the absorber 39 where the two fluids unite or the like to produce a strong ammoniacal-liquor to be received in a receiver 42 whence it may be drawn by way of a duct 43, 43, having a check valve 44, to a transfer control unit 49—50—51, above described.

As usual, a suitable thermostat may be associated with the heat exchanger 36—36 and connected with the heating means 21 to regulate the action of the generator 20.

Referring now to Fig. 1 and Figs. 2-5, when the contents of the generator 20 is heated to produce a gas or gaseous ammonia for the rectifier as above described, the liquor in the lower chamber portion of the generator 20 becomes what is termed a weak liquor and also by reason of a pressure being generated in such chamber the weak ammoniacal liquor will flow by way of the duct inlet portion 53 of the duct 52 which extends out of the dome or drum 22 and to the cooling means 54, and the cooled weak liquor flows by way of duct portions 57 and 59 to a control device 58 into the inlet portion 39 of the absorber 39 to unite or mix with the ammonia fluid or gas moving from the evaporator 36—36 by way of the check valve 37 to the absorber 39.

As the cooled weak liquor also flows from the duct 57 by way of the duct 60 to the control means 62, and to the chamber 157 of the transfer unit 51, such liquor will absorb the ammonia gas then present in the chamber 51 which reduces the pressure in the chamber 51 below that of the absorber, so that the rich liquor in the receiver 42 flows by way of the duct 43, 43 and check valve 44, to chambers 185 and 165 to tube 50 to rise in the chamber 51 to fill it. The head of the liquid in the chamber 51, up to this time, has been less than that in the absorber 39. Then the flow of the cooled weak liquid, which is at generator pressure, flows in by way of the control 62 and soon builds up the pressure in the chamber 51 to about the pressure in the generator. Then, at this time the flip valve operates to pass ammonia gas, under generator pressure, to the top of the chamber 51. Thus the liquid in the chamber 51 flows down, by gravity, by way of the tube 50, chamber 165, thence by way of duct 45, check valve 46 and duct 47 to the dome 22 of the generator. At the same time the valve 186 closes.

In the lower part of the chamber 51 is provided a well 160 in which some of the liquid of the chamber 51 may be retarded to flow slowly through the openings 159A of the dam 159 and slowly down the sides of the expansion tube 50, in sheet or film form, so as to quickly absorb ammonia vapors, the absorption of which develops sufficient heat to cause sufficient elongation of the expansion tube 50 to actuate the transfer control means 49.

As the tube 50 expands and the device 49 lowers, the lever end 170 of the lever 167 operates the valve means 171, 172, 173 and 174 for the valve 178 to open and to allow escape of ammonia gas by way of chamber 165, channels 184, well 182, tubular part 181 to the duct 63 to the entry 38 end of the absorber.

When the ammonia gas has thus exhausted the contents of the transfer unit 51—50, then the pressure therein drops, and hence the pressure of the ammonia gas in the chamber 133 of the flip valve 66, that pressure being the same as in the generator 20, immediately closes the flip valve 119 and shuts off the duct 67.

At this point of operation the flow of cooled weak liquor by way of the control means 62 into the chamber 157 absorbs some of the ammonia in the chamber 51 and thus causes a reduction of pressure, so that liquor is drawn up in the tube 50 and chamber 51 from the receiver 42, and cools the tube 50. The tube 50 contracts and the valve 178 closes.

When the pressure in the chambers 50 and 51 is sufficiently lowered below that in the absorber 39, then strong liquor from the receiver 42 will flow into the transfer unit 51, and when the latter is filled the cycle of operation is repeated.

While I have herein described and upon the drawing shown a preferred embodiment of the invention, it is to be understood that the invention is not limited thereto but comprehends other constructions, details, arrangements of parts, features, and the like without departing from the spirit of the invention.

Having thus disclosed the invention, I claim:

1. In a heat exchange unit of the character described generating means for producing a vapor; means for condensing said vapor; a heat exchange unit to evaporate said condensed vapor and absorb heat to effect cooling exteriorly thereof; an absorber connected to said heat exchanger unit; a transfer chamber for receiving a liquor from said absorber and vapor from said generating means; control means selectively operable to deliver said liquor to said generating means and vapor to said absorber; and expansible means associated with said transfer chamber and control means operative upon the generation of heat by the absorption of a portion of said vapor by said liquor in said transfer chamber to actuate said control means and permit vapor in said transfer chamber to pass to said absorber.

2. In a heat exchange unit of the character described generating means for producing a vapor; means for condensing said vapor; a heat exchange unit to evaporate said condensed vapor and absorb heat to effect cooling exteriorly thereof; an absorber connected to said heat exchanger unit; a transfer chamber for receiving a liquor from said absorber and a vapor from said generating means; control means selectively operable to deliver said liquor to said generating means and vapor to said absorber; an expandible tube associated with said transfer chamber and control means operative upon the generation of heat by the absorption of a portion of said vapor by said liquor in said transfer chamber to actuate said control means and permit vapor in said transfer chamber to pass to said absorber; and means in said chamber to effect a rapid absorption of a portion of said vapor by said liquor in said transfer chamber and generate heat to expand said expandible tube.

3. In a heat exchange unit of the character described generating means for producing a vapor; means for condensing said vapor; a heat exchange unit to evaporate said condensed vapor and absorb heat to effect cooling exteriorly thereof; an absorber connected to said heat exchange unit; a transfer chamber for receiving a liquor from said absorber and vapor from said generating means; means directing a weak liquor from said generating means to said transfer chamber to absorb a portion of said vapor therein and effect a lowering of pressure in said transfer chamber; expansible means connected to said chamber responsive to heat generated by the absorption of vapor in said chamber; control means alternately selectively operable upon the reduction of pressure in said chamber to admit liquor to said chamber from said absorber and upon the expansion of said expansible means to admit vapor to said absorber; and means in said chamber to effect a rapid absorption of a portion of said vapor by said liquor in said transfer chamber and generate heat to expand said expansible means.

4. The device as set forth in claim 3 wherein said expansible means comprises an elongate metallic tube responsive to variations in temperature to control the flow of vapor from said chamber to said absorber.

5. The device as set forth in claim 3 wherein said last named means comprises dam means disposed between said tube and chamber to regulate the flow of liquor and effect a more rapid absorption and generation of heat to expand said tube.

6. The device as set forth in claim 5 wherein said last named means comprises a pipe disposed between said tube and chamber extending into said chamber to maintain a liquor level in said chamber whereby liquor is allowed to overflow to said tube in a dispersed manner to effect rapid absorption and generation of heat to expand said tube.

7. The device as set forth in claim 6 wherein said pipe is provided with a plurality of openings to regulate and disperse the flow of liquor to said tube.

8. In a heat exchange unit of the character described generating means for producing a vapor; means for condensing said vapor; a heat exchange unit to evaporate said condensed vapor and absorb heat to effect cooling exteriorly thereof; an absorber connected to said heat exchange unit; a transfer chamber for receiving a liquor from said absorber and a vapor from said generating means; means directing a weak liquor from said generating means to said transfer chamber to absorb a portion of said vapor therein and effect a lowering of pressure in said chamber; expansible means connected to said chamber responsive to heat generated by the absorption of vapor in said chamber; control means associated with said absorber, generating means, and chamber; and valve means in said control means responsive to a lowering of pressure in said chamber to admit liquor to said chamber from said absorber and responsive to the expansion of said expansible means to admit vapor from said chamber to said absorber.

9. The device as set forth in claim 8 wherein said valve means comprises a pair of valves one of which is associated with and responsive to expansion of said expansible means to admit vapor from said chamber to said absorber.

10. The device as set forth in claim 9 wherein said expansible means comprises a thermally expandible duct from said transfer chamber to said transfer control means and a thermally non-expanding element connected to said transfer chamber and said one valve for controlling the flow of vapor from said chamber to said absorber.

11. In a heat exchange of the character described generating means containing a liquor composed of a gaseous constituent and a liquid component normally combined when at normal temperature; means for applying heat to the liquor to liberate the gaseous constituent; means for drying the gaseous constituent; means for condensing the gaseous constituent; a heat exchange unit to evaporate said condensed gaseous constituent and absorb heat to effect cooling exteriorly thereof; an absorber connected to said heat exchange unit; a transfer chamber for receiving a liquor from said absorber and a gaseous constituent from said generating means; control means selectively operable to deliver said liquor to said generating means and gaseous constituent to said absorber; flip valve means for controlling the flow of a gaseous constituent to said transfer chamber; and expansible means associated with said transfer chamber and control means operative upon the generation of heat by the absorption of a portion of said gaseous constituent by said liquor in said transfer chamber to actuate said control means and permit the gaseous constituent in said transfer chamber to pass to said absorber.

12. The device as set forth in claim 11 wherein said flip valve means comprises a housing; means connecting said housing to said generating means;; a duct connecting said housing to said transfer chamber; a stud portion associated with said duct; a movable valve member selectively movable relative to said stud to open and close said duct; a carrier for said valve member; and a flexible member for holding said carrier and movable valve member in a given relation to said stud portion.

13. The device as set forth in claim 12 wherein there is provided means in said housing operatively associated with said valve member and carrier for adjusting the position of said valve and carrier in said housing.

JULES BUCHEL.

References Cited in the file of this patent

UNITED STATES PATENTS

| Number | Name | Date |
| --- | --- | --- |
| 1,414,527 | Schurtz | May 2, 1922 |
| 1,903,437 | Buchel | Apr. 11, 1933 |
| 1,960,809 | Dahlgren | May 29, 1934 |
| 1,972,580 | Zellhoefer | Sept. 4, 1934 |
| 2,025,489 | Zellhoefer | Dec. 24, 1935 |
| 2,237,302 | Flukes | Apr. 8, 1941 |
| 2,237,622 | Hubacker | Apr. 8, 1941 |
| 2,354,705 | Roth | Aug. 1, 1944 |